(12) United States Patent
Tibbott et al.

(10) Patent No.: US 8,133,032 B2
(45) Date of Patent: Mar. 13, 2012

(54) ROTOR BLADES

(75) Inventors: Ian Tibbott, Staffordshire (GB); Edwin Dane, Nottingham (GB); Dougal Richard Jackson, Derby (GB)

(73) Assignee: Rolls-Royce, PLC (GB)

( * ) Notice: Subject to any disclaimer, the term of this patent is extended or adjusted under 35 U.S.C. 154(b) by 539 days.

(21) Appl. No.: 12/327,030

(22) Filed: Dec. 3, 2008

(65) Prior Publication Data

US 2009/0162200 A1 Jun. 25, 2009

(30) Foreign Application Priority Data

Dec. 19, 2007 (GB) .................................. 0724612.7

(51) Int. Cl.
F01D 5/14 (2006.01)
F01D 5/18 (2006.01)

(52) U.S. Cl. ..................... 416/235; 416/236 R

(58) Field of Classification Search .......................... None
See application file for complete search history.

(56) References Cited

U.S. PATENT DOCUMENTS

| 2,010,094 | A | * | 8/1935 | Leinweber | ................ 416/236 R |
| 3,635,585 | A | * | 1/1972 | Metzler, Jr. | ................. 416/97 R |
| 3,854,842 | A | * | 12/1974 | Caudill | ........................ 415/116 |
| 4,390,320 | A | * | 6/1983 | Eiswerth | ........................ 416/92 |
| 4,424,001 | A | * | 1/1984 | North et al. | ..................... 416/92 |
| 4,606,701 | A | * | 8/1986 | McClay et al. | ............. 416/97 R |
| 5,217,349 | A | * | 6/1993 | Succi | ............................... 416/91 |
| 5,356,265 | A | * | 10/1994 | Kercher | ...................... 416/97 R |
| 5,503,527 | A |  | 4/1996 | Lee et al. | |
| 5,564,902 | A | * | 10/1996 | Tomita | ........................ 416/97 R |
| 5,733,102 | A |  | 3/1998 | Lee et al. | |
| 5,997,251 | A | * | 12/1999 | Lee | ............................. 416/97 R |
| 6,027,306 | A | * | 2/2000 | Bunker | ...................... 415/173.5 |
| 6,059,530 | A |  | 5/2000 | Lee | |
| 6,190,129 | B1 | * | 2/2001 | Mayer et al. | ................ 416/97 R |
| 6,616,406 | B2 | * | 9/2003 | Liang | .......................... 416/97 R |
| 7,513,743 | B2 | * | 4/2009 | Liang | ............................... 416/92 |
| 2001/0048878 | A1 |  | 12/2001 | Willett et al. | |
| 2005/0232771 | A1 |  | 10/2005 | Harvey et al. | |
| 2008/0170946 | A1 |  | 7/2008 | Brittingham et al. | |

FOREIGN PATENT DOCUMENTS

| EP | 1591624 A1 | 4/2004 |
| EP | 1693552 A2 | 1/2006 |
| EP | 1865149 A2 | 12/2007 |
| EP | 1903183 A2 | 3/2008 |
| GB | 2075129 A | 11/1981 |

* cited by examiner

*Primary Examiner* — Scott B Geyer
(74) *Attorney, Agent, or Firm* — McCormick, Paulding & Huber LLP

(57) ABSTRACT

A rotor blade has a tip with an outer face including at least two channels which each extend to an outlet in the vicinity of the trailing edge. Accordingly, gas leakage around the tip must cross at least three walls, at least in the vicinity of the uncovered turning region near the trailing edge of the blade. Leakage gas entering the channels will tend to create a vortex and pass along the channel to the outlet.

12 Claims, 4 Drawing Sheets

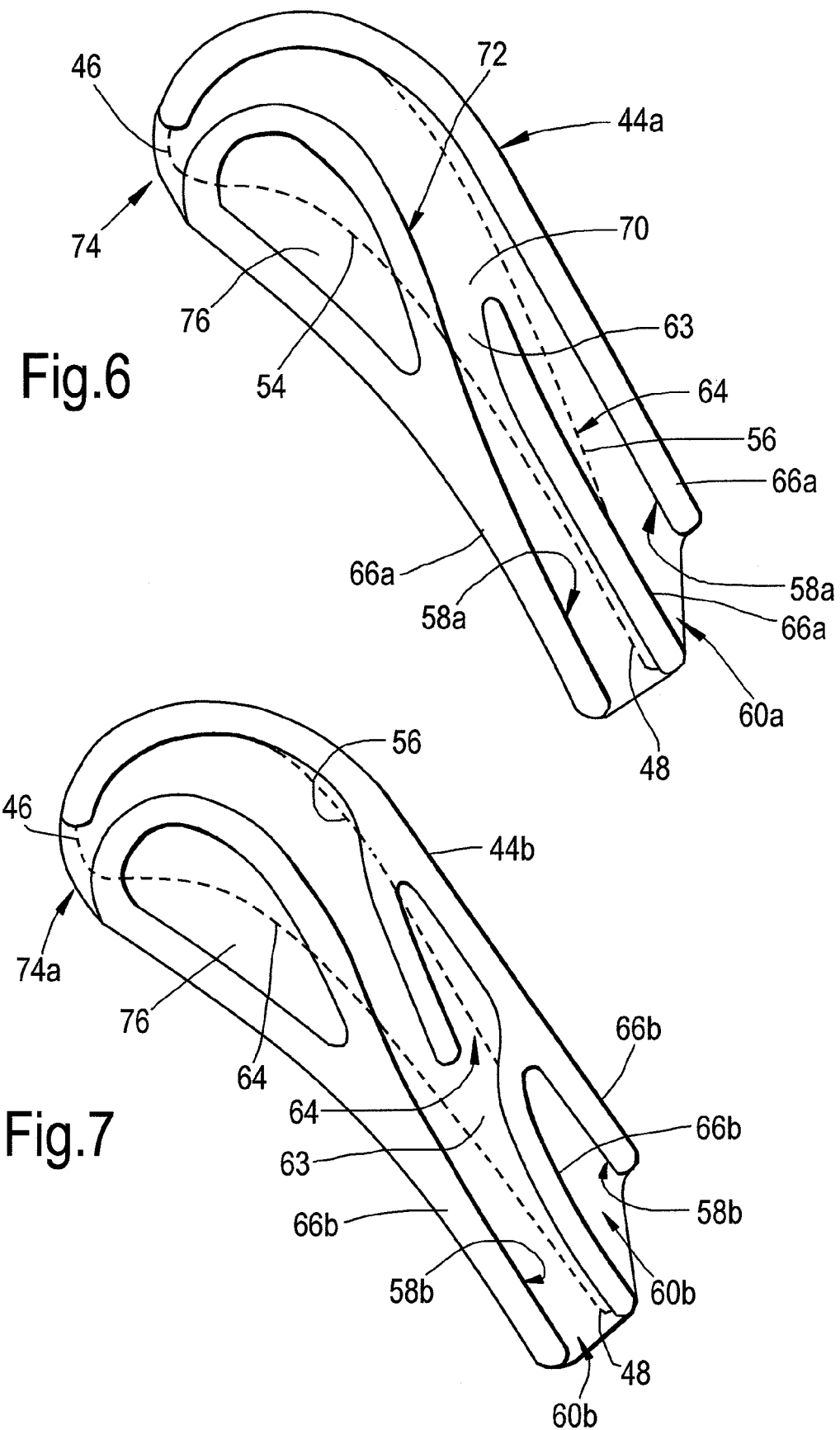

ROTOR BLADES

CROSS REFERENCE TO RELATED APPLICATION

This application is entitled to the benefit of British Patent Application No. GB 0724612.7, filed on Dec. 19, 2007.

FIELD OF THE INVENTION

The present invention relates to rotor blades.

BACKGROUND OF THE INVENTION

Rotor blades are used in gas turbine engines to interact with combustion gases to convert kinetic energy of the combustion gases into rotation of the rotor. The efficiency of the engine is affected by the manner in which the combustion gases flow around the rotor blades.

SUMMARY OF THE INVENTION

Examples of the present invention provide a rotor blade having a trailing edge and a tip, the tip having an outer face, which includes at least two channels, each of the channels extending to an outlet in the vicinity of the trailing edge.

The blade may have a leading edge, at least one of the channels extending to the outlet from the vicinity of the leading edge. At least one of the channels may have an inlet in the vicinity of the leading edge. At least two channels may have an inlet in common. The outer face may include a common upstream channel, which bifurcates to provide the said two channels.

There may be at least two channels, which extend generally alongside each other over the uncovered turning region of the blade. There may be at least two channels, which extend to the outlet from a position approximately midway between the leading and trailing edges of the blade.

The two channels may be defined by at least three walls upstanding at the tip. One or more of the walls may be canted toward the pressure face of the blade.

The blade may further comprise at least one recess in the outer face, the recess being closed to the trailing edge.

In another aspect, examples of the invention provide a gas turbine engine comprising at least one rotor blade as aforesaid.

BRIEF DESCRIPTION OF THE DRAWINGS

FIGS. 6 and 7 correspond with FIG. 3, showing alternative examples.

DETAILED DESCRIPTION OF THE PREFERRED EMBODIMENTS

Figure 1:
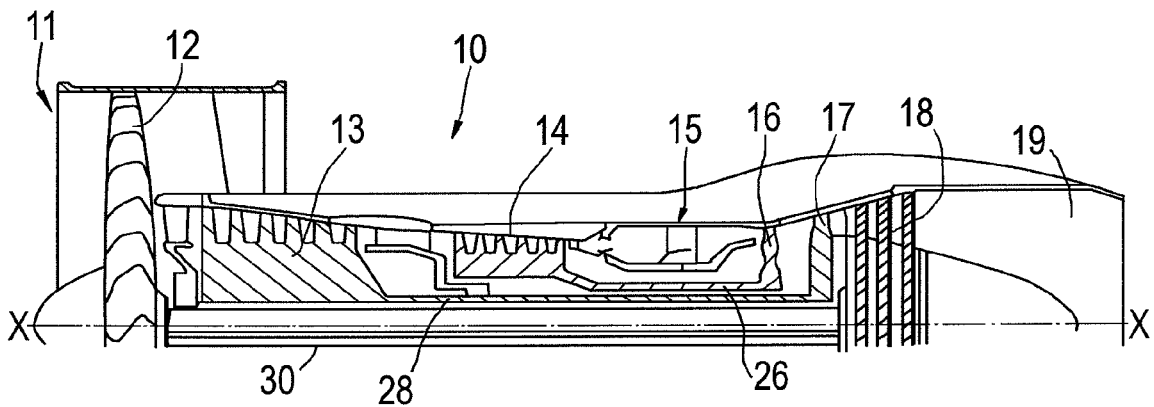
FIG. 1 is a section through a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

Figure 2:
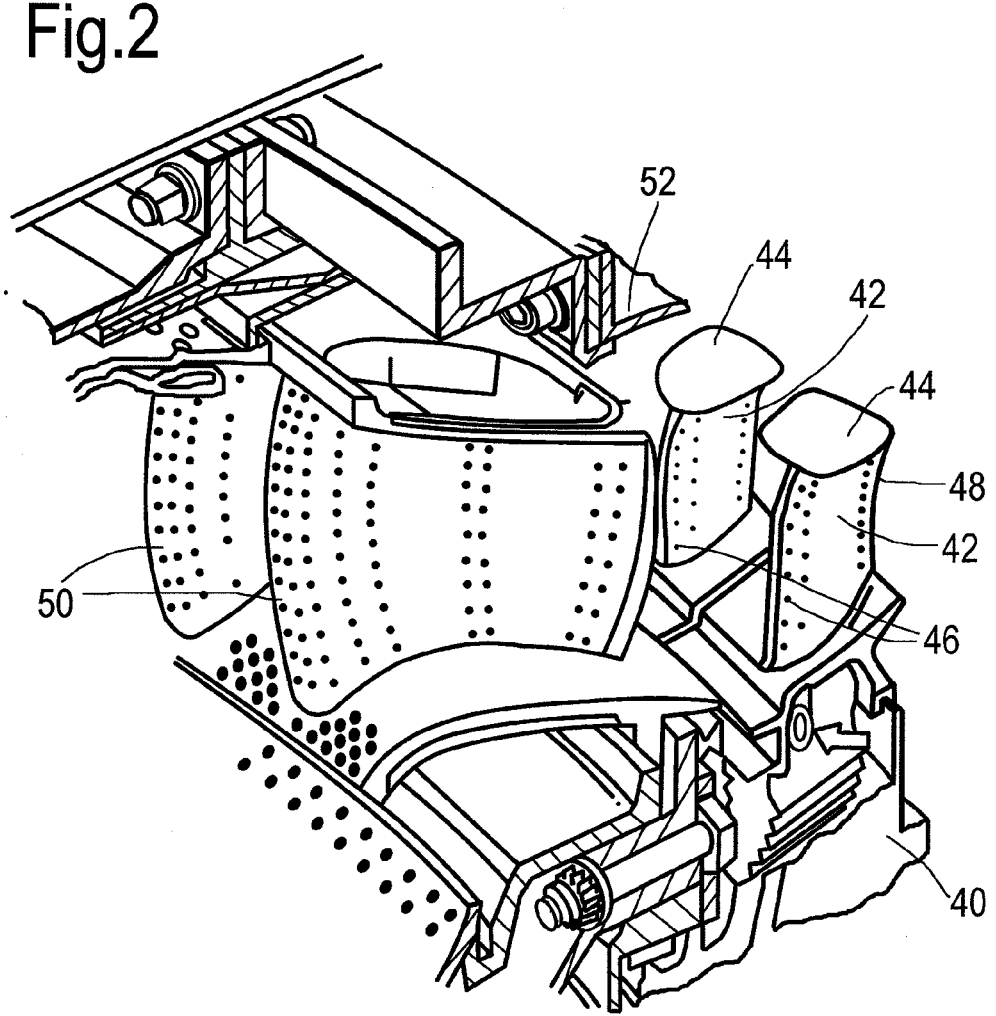
FIG. 2 is an enlarged partial perspective view of a turbine stage of the engine of FIG. 1.

FIG. 2 illustrates one turbine stage of the engine 10, in more detail. A turbine disc 40 carries a ring of rotor blades 42 around its circumference. Each blade 42 extends generally radially out from the disc 40 to an outermost tip 44. In the region between the disc 40 and the tip 44, each blade 42 has an aerofoil section which, in use, interacts with combustion gases passing through the ring of blades 42, to drive the rotation of the disc 40. The aerofoil section of each blade 42 has a leading edge 46 and a trailing edge 48. The faces of the blades 42 are shaped to create a pressure side and a suction side by aerodynamic lift, as the combustion gases pass.

A ring of static nozzle guide vanes 50 are provided upstream of the blades 42, to further improve the flow characteristics of combustion gases through the blades 42, thereby increasing the efficiency of the stage.

The tips 44 rotate in close proximity with a fixed component 52, which may be a lining or shroud segment. The pressure difference at the two surfaces of the blades 42 creates a tendency for combustion gas leakage from the pressure side to the suction side, around the tip 44. Examples can now be described for arrangements to control leakage flow around the tips 44.

Figure 3:
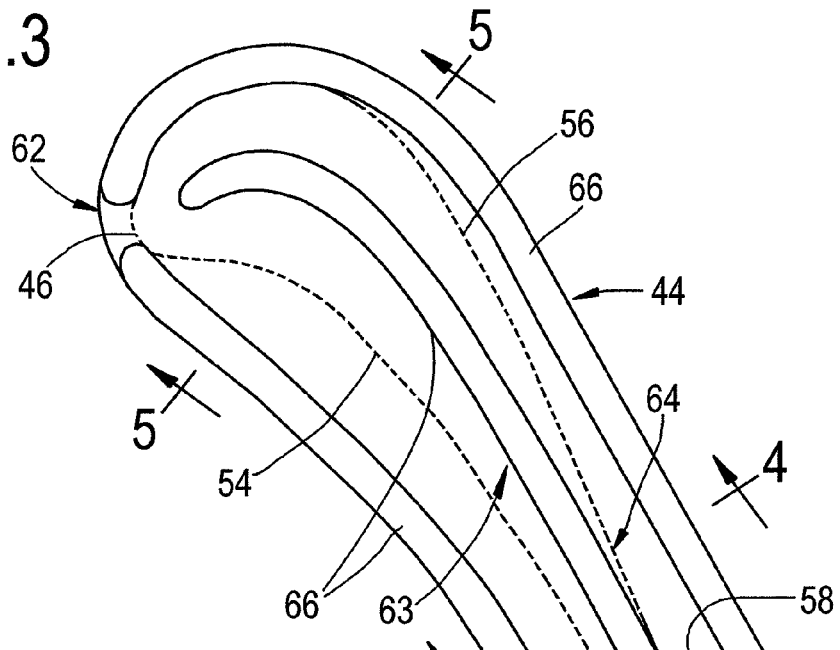
FIG. 3 is an end view of the tip of a turbine blade which is an example embodiment of the invention.

FIG. 3 is an end view of a rotor blade 42, showing the tip 44 in plan. In FIG. 3, dotted lines indicate the section of the aerofoil of the blade 42, including the leading edge 46, trailing edge 48, pressure side 54 and suction side 56. It can readily be seen that the tip 44 extends beyond the faces 54, 56, as a winglet or mini shroud at the tip of the blade 42.

FIG. 3 shows the outer face 57 of the blade tip 44, that is, the face, which faces radially away from the turbine disc 40, toward the fixed component 52. This outer face includes, in this example, two channels 58. Each channel 58 extends to an outlet 60 in the vicinity of the trailing edge 48. In this example, each channel 58 has an inlet 62 in the vicinity of the leading edge 46. Accordingly, each of the channels 58 extends to the outlet 60 from the inlet 62, in the vicinity of the leading edge 46. In this example, the channels 58 share the inlet 62. That is, the channels 58 have an inlet 62 in common. It can be seen from FIG. 3 that the two channels 58 extended generally alongside each other from the vicinity of the leading edge, to the vicinity of the trailing edge 48. In particular, the channels 58 are alongside each other from a position 63 approximately midway between the leading and trailing edges 46, 48 and are therefore alongside each other over the relatively thin part of the blade 42, toward the rear of the blade. This part of the blade is indicated generally in FIG. 3 by the numeral 64 and is commonly known as the "uncovered turning region" of the blade.

The two channels 58 are defined by walls 66 (FIG. 4), which are upstanding at the tip 44.

Figure 4:
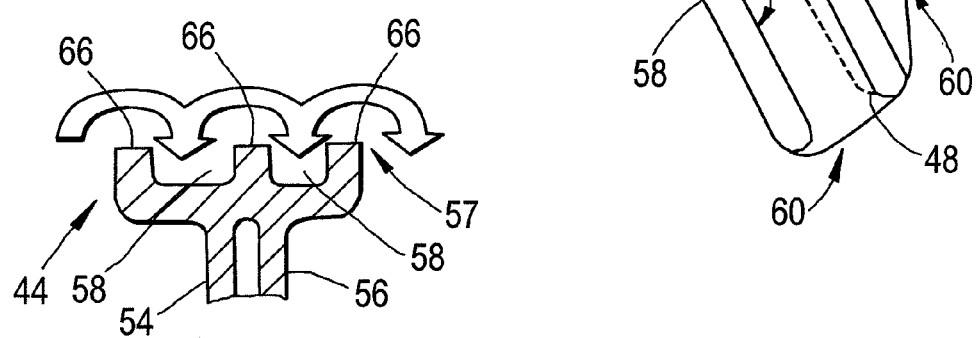
FIGS. 4 and 5 are sections of the tip of FIG. 3, at the lines 4-4 and 5-5 of FIG. 3.

FIG. 4 provides a simplified indication of the path of leakage air seeking to leak over the tip 44 from the pressure side 54 to the suction side 56. The path is indicated by bold arrows. It can be seen that in order to leak, gases must pass all three walls 66. In practice, gases passing around the first wall 66 into the first channel 58 will tend to create a vortex in the channel 58. The gases will then tend to move along the channel 58 toward the low pressure at the outlet 60. This movement along the channel 58 creates a crossflow to inhibit leakage further downstream into the channel 58. Gases leaving the outlet 60 will tend to fill the wake left by the trailing edge 48.

In the event that any gas leaks past the middle wall 66 to the second channel 58, a similar vortex effect will tend to occur, again resulting in drainage of the leakage gas along the channel 58 to the outlet 60, and creating crossflow to inhibit further leakage to the second channel 58.

The channels 58 therefore provide a form of gutter effect, tending to direct leakage gas to the outlet 60.

Figure 5:
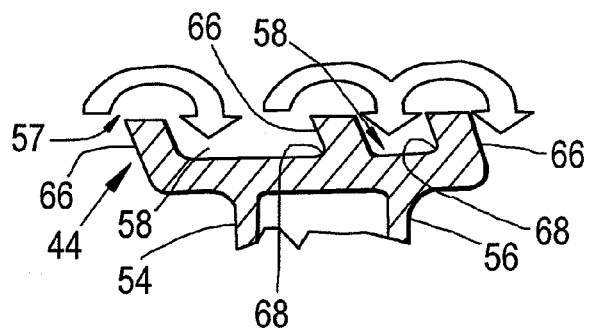

Leakage can be further inhibited in an optional manner indicated in FIG. 5. In FIG. 5, the three walls 66 are shown canted or leaning. The walls 66 are canted toward the pressure side 54, so that gas which passes over a wall 66 to enter a channel 58 is confronted by another wall on the far side of the channel 58, with a concavity 68 at the floor of the channel 58. The walls 66 therefore co-operate with the fixed component 52 to provide a form of labyrinth seal, further inhibiting gas leakage around the tip 44.

FIG. 6 is a similar view to FIG. 3, showing an alternative example of a rotor blade. In this example, the outer face of the blade tip 44a, that is, the face, which faces radially away from the turbine disc 40, toward the fixed component 52, includes two channels 58a. Each channel 58a extends to an outlet 60a in the vicinity of the trailing edge 48. In this example, the two channels do not each extend to the leading edge 46. Instead, the two channels 58a meet at a bifurcation 70. A common upstream channel 72 has an inlet 74 in the vicinity of the leading edge 46 and extends to the bifurcation 70, to communicate with the channels 58a. The bifurcation 70 is at or closer to the leading edge 46 than a position generally midway between the leading and trailing edges 46, 48. It can be seen from FIG. 3 that the two channels 58a extend generally alongside each other from the bifurcation 70 to the vicinity of the trailing edge 48. In particular, the channels 58a are alongside each other from a position 63 approximately midway between the leading and trailing edges 46, 48 and are alongside each other over the uncovered turning region 64 of the blade 42.

The two channels 58a are again defined by walls 66a generally as illustrated in FIG. 4, and which are upstanding at the tip 44a. Accordingly, in order to leak, gases in the uncovered turning region of the blade must pass three walls 66a. In practice, gases passing into either of the channels 58a will tend to enter the channel and create a vortex, as described above in relation to FIG. 4. The gases will then tend to move along the channel 58a toward the low pressure at the outlet 60a. Again, this movement along the channel 58a creates a crossflow to inhibit leakage further downstream. Gases leaving the outlet 60a will tend to fill the wake left by the trailing edge 48.

Leakage can be further inhibited by the use of canted walls, in the manner indicated in FIG. 5.

FIG. 7 is a similar view to FIG. 3, showing an alternative example of a rotor blade. In this example, the outer face of the blade tip 44b, that is, the face, which faces radially away from the turbine disc 40, includes, in this example, two channels 58b. Each channel 58b extends to an outlet 60b in the vicinity of the trailing edge 48. One of the channels 58b extends from an inlet 74a at the leading edge 46. The other channel 58b is shorter, beginning part way along the tip 44, to extend over all or most of the uncovered turning region 64. It can be seen from FIG. 7 that the two channels 58b extend alongside each other from a position 63 approximately midway between the leading and trailing edges 46, 48 and are alongside each other over the uncovered turning region 64 of the blade.

The two channels 58b are again defined by walls 66b generally as illustrated in FIG. 4, and which are upstanding at the tip 44. Accordingly, in order to leak, gases in the uncovered turning region of the blade must pass three walls 66b. In practice, gases passing into either of the channels 58b will tend to enter the channel and create a vortex, as described above in relation to FIG. 4. The gases will then tend to move along the channel 58b toward the low pressure at the outlet 60b. Again, this movement along the channel 58b creates a crossflow to inhibit leakage further downstream. Gases leaving the outlet 60b will tend to fill the wake left by the trailing edge 48.

Leakage can be further inhibited by the use of canted walls, in the manner indicated in FIG. 5.

The views of FIG. 8 illustrate various alternative arrangements at the vicinity of the leading edge 46. In FIG. 8a, two channels 58c extend from the leading edge 46 but have no inlet at the leading edge 46. Accordingly, gas enters the channels 58c only by leakage around the tip 44. The two channels 58c are not connected to each other.

Figure 8A:
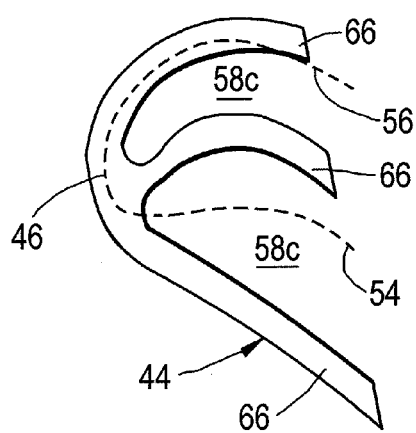
FIGS. 8a to 8d are details corresponding with FIGS. 3, 6 and 7, showing further examples.
Figure 8B:
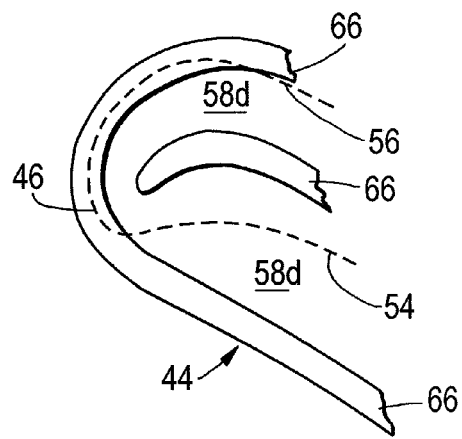

In FIG. 8b, two channels 58d extend from the leading edge 46 but have no inlet at the leading edge 46. Accordingly, gas enters the channels 58d only by leakage around the tip 44. The channels 58d are connected to each other in the vicinity of the leading edge 46.

Figure 8C:
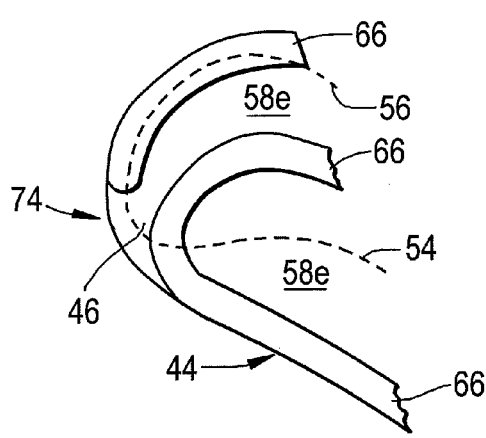
Figure 8D:
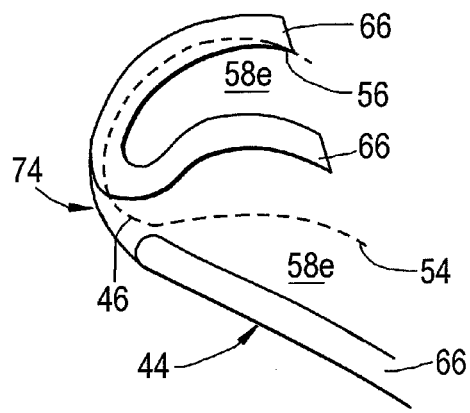

In FIGS. 8c and 8d, two channels 58e extend from the leading edge 46. In each drawing, one or other of the channels 58e has an inlet 74 in the vicinity of the leading edge 46. The other channel 58e has no inlet. The two channels 58e are not connected to each other.

In any of the examples described above, the tip 44 could be formed to define at least one recess 76 in the outer face, as illustrated in FIGS. 6 and 7. It can be seen (FIGS. 6 and 7) that the recesses 76 are closed to the trailing edge and thus do not provide the gutter function for channelling leakage gas to the trailing edge 48.

The walls 66 may carry abrasive material on the upper edges. This allows the engine to be set up with closer tolerances between the tip 44 and the fixed component 52, allowing the abrasive material to abrade the fixed component 52, in the event of contact. This closer tolerance further inhibits leakage flow. The wall 66 may be locally widened to accommodate abrasive material, if required.

It is envisaged that the examples illustrated above, and alternative examples, will exhibit improved blade tip sealing properties and thus reduce blade tip leakage flow. A reduction in blade tip leakage flow is expected to result in fewer losses arising from aerodynamic mixing of high and low pressure gases around the aerofoil and this, in turn, is expected to result in improved aerodynamic efficiency of each blade and thus of the stage, resulting in improved specific fuel consumption for the engine.

Improved blade tip sealing and reduced blade tip leakage flow is also expected to reduce the temperature of components of the blade, particularly at the tip, resulting in improved life expectancy and allowing the weight of components to be reduced to allow higher blade speeds or a reduction in stress within the components.

Passages can be incorporated within any of the examples described, to convey cooling air to outlets at appropriate positions.

Many variations and alternatives can be envisaged to the examples described above. Different wall shapes could be envisaged, and different wall sections could be used, such as canted, sloping or stepped sections. The depth and width of the various channels may be substantially constant along the length of the channel, or may be varied at different positions along the length. The exposed surfaces of the tip may be protected with anti-abrasion coatings.

In the examples described above, each gutter channel leads to a respective outlet, but a common outlet could be provided for one or more channels.

The examples described above can be used in turbine blades for aero engines, marine engines or industrial engines. The arrangements can be incorporated within cooled or uncooled turbine blades. The arrangements can be incorporated within turbine blades designed for contact or noncontact at their tips.

We claim:

1. A rotor blade comprising a trailing edge and a tip, the tip being at the radially outermost end of the blade and having an outer face which includes at least two channels, each of the channels extending to an outlet in the vicinity of the trailing edge, wherein the two channels are defined by at least three walls upstanding at the tip.

2. A blade according to claim 1, wherein the blade further comprises a leading edge, at least one of the channels extending to the outlet from the vicinity of the leading edge.

3. A blade according to claim 1, wherein at least one of the channels has an inlet in the vicinity of the leading edge.

4. A blade according to claim 1, wherein said two channels have an inlet in common.

5. A blade according to claim 1, wherein the outer face further comprises a common upstream channel which bifurcates to provide the said two channels.

6. A blade according to claim 1, wherein said two channels extend generally alongside each other over the uncovered turning region of the blade.

7. A blade according to claim 1, wherein said two channels extend to the outlet from a position approximately midway between the leading and trailing edges of the blade.

8. A blade according to claim 1, wherein one or more of the walls is canted toward the pressure face of the blade.

9. A blade according to claim 1, wherein the blade further comprises at least one recess in the outer face, the recess being closed to the trailing edge.

10. A gas turbine engine comprising at least one rotor blade as defined in claim 1.

11. A rotor blade comprising a trailing edge and a tip, the tip having a radially outward face which includes at least two channels, each of the channels extending to an outlet in the vicinity of the trailing edge, wherein the two channels are defined by at least three walls upstanding at the tip.

12. A rotor blade comprising a pressure face, a suction face, a trailing edge, a leading edge, and a tip extending from the radially outward end of the trailing edge to the radially outward end of the leading edge, the trailing edge, the tip, and the leading edge contiguously joining the pressure face to the suction face, the tip having an outer face which includes at least two channels, each of the channels extending to an outlet in the vicinity of the trailing edge, wherein the two channels are defined by at least three walls upstanding at the tip.

* * * * *